United States Patent
Sugimoto (10) Patent No.: US 7,372,591 B2
(45) Date of Patent: May 13, 2008

(54) IMAGE FORMING DEVICE AND IMAGE FORMING METHOD

(75) Inventor: Tasuku Sugimoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 980 days.

(21) Appl. No.: 10/667,467

(22) Filed: Sep. 23, 2003

(65) Prior Publication Data

US 2004/0061895 A1 Apr. 1, 2004

(30) Foreign Application Priority Data

Sep. 27, 2002 (JP) ............................. 2002-283832

(51) Int. Cl.
*G06K 1/00* (2006.01)
*G06F 15/00* (2006.01)

(52) U.S. Cl. ..................... 358/1.15; 358/539; 708/203

(58) Field of Classification Search ............... 358/1.16, 358/1.15, 1.14, 1.2, 1.9, 528, 444, 400, 539; 395/114, 112, 115; 709/226; 235/375; 270/12, 270/30.05; 382/232

See application file for complete search history.

(56) References Cited

U.S. PATENT DOCUMENTS

| | | | | |
|---|---|---|---|---|
| 5,864,652 A * | 1/1999 | Murahashi | ................. | 358/1.16 |
| 6,009,242 A * | 12/1999 | Anzai | ........................ | 358/1.15 |
| 6,295,117 B2 * | 9/2001 | Haraguchi et al. | ............ | 355/40 |
| 6,321,266 B1 * | 11/2001 | Yokomizo et al. | .......... | 709/226 |
| 6,798,534 B1 * | 9/2004 | Nishigaki et al. | .......... | 358/1.16 |
| 6,906,822 B1 * | 6/2005 | Nohnishi | ................... | 358/1.16 |
| 6,965,453 B1 * | 11/2005 | Mori | .......................... | 358/1.9 |
| 7,009,722 B1 * | 3/2006 | Nishigaki | .................. | 358/1.15 |
| 7,222,780 B2 * | 5/2007 | Lapstun et al. | ............. | 235/375 |
| 2001/0043354 A1 * | 11/2001 | Miyake et al. | ............. | 358/1.15 |
| 2002/0126311 A1 * | 9/2002 | Tanaka | ....................... | 358/1.15 |
| 2003/0016391 A1 * | 1/2003 | Tamura | ..................... | 358/1.16 |

FOREIGN PATENT DOCUMENTS

JP    A 10-16322    1/1998

* cited by examiner

*Primary Examiner*—King Y. Poon
*Assistant Examiner*—Allen H. Nguyen
(74) *Attorney, Agent, or Firm*—Oliff & Berridge, PLC (57) ABSTRACT

An mage forming device and image forming method capable of performing selective data compression. Printing data transmitted from a host computer are stored in RAM and developed into image data by CPU. The CPU determines whether or not the greatest raster length in the image data of each page exceeds a reference value that represents the data transfer ability of the laser printer (and corresponds to the value of 80% of the largest printing width of the laser printer) on a page by pages. If the greatest raster length exceeds the reference value, the image data of the page are compressed by the CPU and stored in the RAM. If the greatest raster length do not exceed the value, the image data of the page are stored in the RAM without being compressed. Then, the image data stored in the RAM are sent to an ASIC on a raster by raster basis. Only compressed image data are decompressed and the decompressed data then are transferred to a laser unit. Non-compressed image data per se are transferred to the laser unit. A printing operation is performed based on the transferred image data.

23 Claims, 6 Drawing Sheets

IMAGE FORMING DEVICE AND IMAGE FORMING METHOD

BACKGROUND OF THE INVENTION

The present invention relates to an image forming device and an image forming method. More particularly, the present invention relates to an image forming device and an image forming method by which image data are transferred to a recording engine after the image data having been compressed and decompressed.

In laser printers, the laser beam modulated based on the image data is made to irradiate a polygon mirror that is driven to rotate at constant rate and the laser beam reflected from the polygon mirror is made to raster-scan a photosensitive body to form an electrostatic latent image on the photosensitive body. Therefore, it is necessary to supply image data that correspond to a raster to the laser scanner unit (to be referred to simply as "laser unit" hereinafter) disposed in the laser engine, that is a recording engine of the laser printer, in synchronism with the rotary motion of the polygon mirror that is rotated at a rate determined as a function of the printing speed (the number of sheets printed in a unit time) and the resolution (the number of dots printed on a unit length) within a predetermined period of time (printing time for a raster).

In recent years, the amount of data that needs to be supplied to the laser unit within a unit time has been remarkably increased for the purpose of realizing color printing and high speed printing. However, it is not possible to transfer the image data stored in the RAM (memory) to some other part at a sufficiently high rate because of the restrictions imposed on the bus width and the bus cycle of the RAM arranged on the main substrate of the laser printer, which is adapted to receive printing data (original data) from the host computer, convert them into image data and subsequently supply them to the laser unit. Therefore, unless the RAM is replaced by some other one that affords a greater bus width and a shorter bus cycle and hence is more costly, it is no longer possible to supply image data by the amount required for the laser unit from the main substrate to the laser unit within the time for printing a raster. Then, the laser printer can become overloaded. To avoid this problem, there has been proposed a technique with which the image data are compressed before they are stored in the RAM and transferred to some other part (e.g., ASIC (application specific integrated circuit) and subsequently the compressed image data are decompressed (expanded) so that the decompressed image data are supplied to the laser unit.

Japanese Patent Application Laid-Open Publication No. 10-16322 discloses such a technique. According to the publication, image data are converted into intermediate data that can be used to form an image on a band by band basis. When the processing time period necessary for forming the image and estimated from the intermediate data is greater than a predetermined period of time, the image data of a page (bit map data) obtained from the intermediate data are compressed and then stored in a RAM so that the image can be formed from the stored image data while the data are being expanded. On the other hand, if the processing time period necessary for forming the image and estimated from the intermediate data is smaller than the predetermined period of time, the image is formed from the intermediate data while the data are being converted into image data on a band by band basis.

According to the printing process described in the publication, the image data obtained from intermediate data are always compressed regardless of the properties and quantities of the image data, if the processing time period necessary for forming the image and estimated from the intermediate data is greater than the predetermined period of time. However, the data volume that can be reduced by compression depends on the original data volume. For instance, the data volume of a long raster in the image data can be reduced by a relatively large amount. On the other hand, the amount of data that can be reduced for a short raster in the image data by compression is relatively small and, in some cases, the data volume may conversely be increased because a coding table must be formed as a result of data compression. If such is the case, data compression does not provide any advantage because CPU requires time period for data compressing operation. Thus, time period allotted for other processing may be decreased. Consequently, processing speed of the printer is disadvantageously reduced as a whole.

SUMMARY OF THE INVENTION

It is therefore an object of the present invention to provide an image forming device and an image forming method capable of effectively suppressing the possible reduction in the processing speed of the device irrespective of the execution of data compression.

This and other object of the invention will be attained by an image forming device including image data generation means, compression determining means, compression means, memory means, decompressing means, a printing engine, and transfer means. The image data generation means generates image data from original data. The compression determining means determines whether or not the image data generated by the image data generating means is to be compressed. The compression means compresses at least a part of the image data required to be compressed as determined by the compression determining means among the image data generated by the image data generation means. The memory means stores a remaining part of the image data remained non-compressed as determined by the compression determining means and the part of the image data compressed by the compression means. The decompressing means decompresses the part of the image data compressed by the compression means and stored in the memory means. The printing engine forms an image on an image recording medium based on the image data. The transfer means transfers the non-compressed image data stored in the memory means and the decompressed image data decompressed by the decompressing means to the printing engine. The compression determining means determines the necessity of data compression on a basis of the image data and a data transferring performance from the memory means to the transfer means.

DETAILED DESCRIPTION OF THE PREFERRED EMBODIMENTS

An image forming device according to a first embodiment of the present invention will be described with reference to FIGS. 1 through 5.

Figure 1:
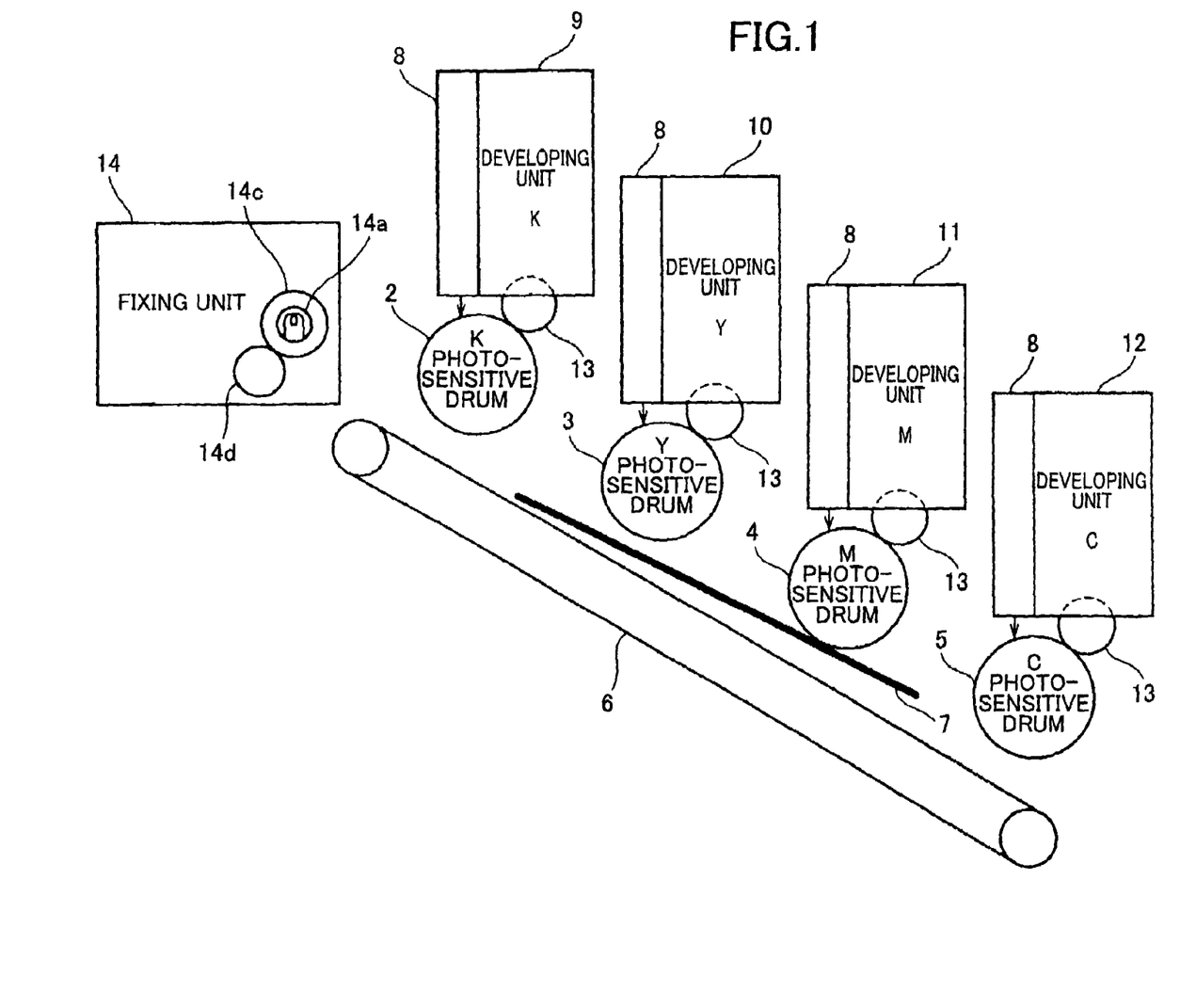
FIG. 1 is a schematic illustration showing a laser printer as an image forming device according to a first embodiment of the present invention.

FIG. 1 is a schematic illustration of a color laser printer according to the first embodiment. The color laser printer 1 shown in FIG. 1 is of the so-called "tandem type", in which four laser engines are arranged in series. More specifically, four photosensitive drums 2, 3, 4 and 5 provided respectively for four different colors of black (K), yellow (Y), magenta (M) and cyan (C) are arranged along the conveyance route of sheets of paper 7, or recording mediums, that are conveyed on conveyor belt (conveyance section) 6. A laser unit (exposure section) 8 is arranged on each of the four photosensitive drums 2, 3, 4 and 5. Each of the laser units 8 is adapted to emit a laser beam for forming a pattern that is a reversal of the pattern of the image data of the related color, which may be K, Y, M or C, modulating the intensity of light. Developing units (developing sections) 9, 10, 11 and 12 for containing respective toners of K, Y, M and C are also arranged on the respective photosensitive drums 2, 3, 4 and 5. Toners are applied from the developing units 9, 10, 11 and 12 to the respective photosensitive drums 2, 3, 4, 5 through respective developing rollers 13 arranged under the developing units.

A fixing unit 14 is disposed at a position downstream of the plurality of laser units 2 through 5. The fixing unit 14 includes a heating roller 14c, a pressure roller 14d and a halogen heater lamp 14a disposed in the heating roller 14c.

Each of the photosensitive drums 2, 3, 4 and 5 is electrically charged in advance by means of a high voltage source 31 (see FIG. 2) and exposed to the laser beam that is emitted from the corresponding laser unit 8 and whose intensity is appropriately modulated. The image data supplied to the laser unit 8 are generated as raster data, when the original printing data supplied from the host computer, which will be described hereinafter, are processed by the CPU 41 (see FIG. 3) in the main substrate 22 (see FIG. 2). The laser units 8 may be replaced by LED arrays.

As the photosensitive drums 2, 3, 4 and 5 are irradiated with the respective laser beams, the surface areas of the photosensitive drums 2, 3, 4 and 5 that are exposed to a laser beam are de-electrified so that desired electrostatic latent images are formed respectively on the photosensitive drums 2, 3, 4 and 5. The surface areas of the photosensitive drums 2, 3, 4 and 5 that are irradiated with the respective laser beams electrostatically adsorb respective toners of the corresponding colors as they are supplied from the respective developing units 9, 10, 11 and 12. The toners of the different colors adsorbed to the respective photosensitive drums 2, 3, 4 and 5 are sequentially transferred onto a sheet of paper 7 in the order of C, M, Y and K as the sheet of paper 7 is conveyed on the conveyor belt 6 because these toners are subjected to electrostatic force that is directed to the conveyor belt 6.

Thereafter, the sheet of paper 7 onto which the toners of the four colors of C, M, Y and K have been transferred in an overlapping manner is led into the fixing unit 14. In the fixing unit 14, the toners are molten at high temperature by means of the halogen heater lamp 14a and the toner image is fixed to the sheet of paper 7 as the latter is pinched and pressed between the heating roller 14c and the pressure roller 14d.

Thus, color printing is realized as image data of four colors of K, Y, M and C are used in the laser printer 1 of this embodiment. Additionally, since the laser printer 1 is of the tandem type, in which four photosensitive drums 2, 3, 4 and 5 are arranged in series along the conveyance route of the sheet of paper 7, print images can be formed at high speed in comparison with a laser printer of the type having only a single photosensitive drum.

Figure 2:
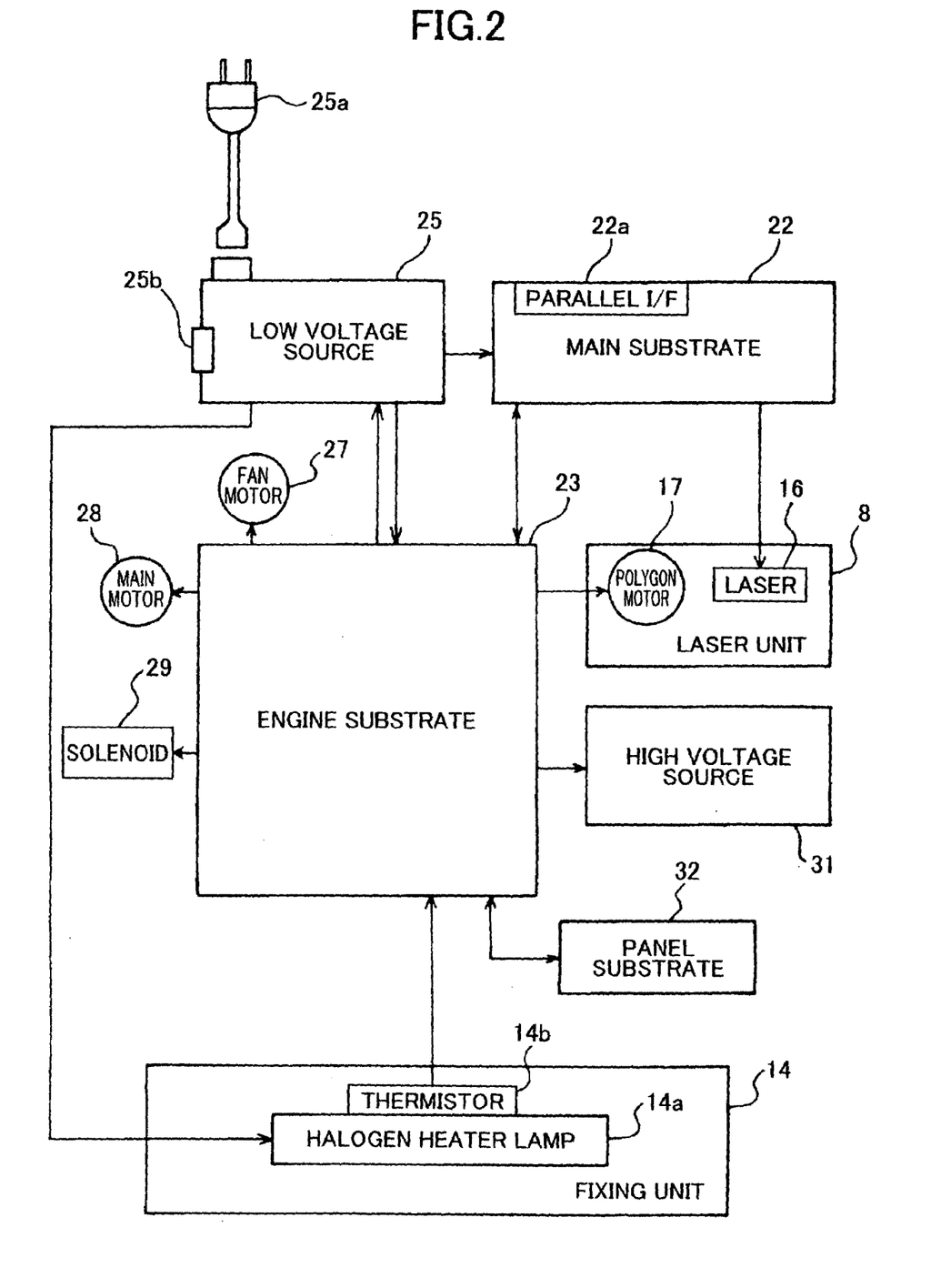
FIG. 2 is a schematic block diagram of the laser printer of FIG. 1.

Now, the laser printer 1 of this embodiment will be described further by referring to the block diagram of FIG. 2. As shown in FIG. 2, the laser printer 1 includes a main substrate 22 and an engine substrate 23. The main substrate 22 is adapted to convert printing data into image data and output the latter to the laser units 8, while generating various instructions to the engine substrate 23. The engine substrate 23 is adapted to control various components of the laser printer 1 including the laser units 8 according to the instructions issued from the main substrate 22. DC voltage is applied to the main substrate 22 and also to the engine substrate 23 from a low voltage source 25 that is connected to an AC power source by way of a power supply plug 25a when the switch 25b of the low voltage source 25 is turned on. The low voltage source 25 also applies AC voltage to the halogen heater lamp 14a in the fixing unit 14 when its switch 25b is turned on.

The main substrate 22 is provided with a parallel interface (I/F) 22a for connecting to the host computer (not shown). Thus, the main substrate 22 receives printing data expressed in a page describing language from the host computer by way of the parallel I/F 22a and develops the received printing data into intermediate codes and then further into image data of a raster data format for each of the four colors of C, M, Y and K. For example, the main substrate 22 develops the received printing data into intermediate codes and then further into image data on a page by page basis. The obtained image data of each of the four colors are supplied to a laser beam source 16 arranged in the laser unit 8 of that color. Note that only one of the four laser units 8 is shown in FIG. 2 for the purpose of simplicity. It may alternatively be so arranged that the laser printer 1 includes only a single laser unit 8 that is adapted to emit laser beams to the respective photosensitive drums 2, 3, 4 and 5.

A semiconductor laser is employed as the laser beam source that emits a laser beam whose intensity is modulated according to the image data applied from the main substrate 22. Alternatively, a solid laser and an intensity modulating element is available as the laser beam source 16 in place of the semiconductor laser. The modulated laser beam emitted from the laser source 16 is reflected by a polygon mirror (not shown) that is driven to rotate at a constant rate by a polygon motor 17 and then made to pass through an fθ lens (not shown) so as to convert a constant angular velocity movement (not shown) in order to convert constant angular velocity movement into a constant linear velocity movement before the laser beam is irradiated onto the corresponding one of the photosensitive drums 2, 3, 4 and 5 for raster-scanning. Therefore, the laser unit 8 needs to be supplied with image data from the main substrate 22 in synchronism with the rotary motion of the polygon mirror in such a way that one of the sides of the polygon mirror corresponds to a raster of the image data. In this way, electrostatic latent images of the four colors are formed respectively on the photosensitive drums 2, 3, 4 and 5 for the desired image to be obtained.

The engine substrate 23 is connected to the fixing unit 14 and to the laser units 8 as well as to a fan motor 27, a main motor 28, a solenoid 29, a high voltage source 31, and a panel substrate 32. The fan motor 27 is adapted for driving a fan to turn in order to cool the inside of the laser printer 1. The main motor 28 is adapted for conveying the sheet of paper 7 and driving the photosensitive drums 2, 3, 4 and 5. The solenoid 29 is adapted for picking up the sheet of paper 7. The high voltage source 31 is adapted for generating a high voltage to be used for electrically charging the photosensitive drums 2, 3, 4 and 5. The panel substrate 32 is adapted for controlling the display operation of a display panel (not shown). Thus, the engine substrate 23 drives the polygon motor 17, the fan motor 27, the main motor 28, the solenoid 29 and the high voltage source 31 at respective appropriate timings according to the instructions received from the main substrate 22 and transmits control signals to the panel substrate 32 at appropriate timings. Additionally, the engine substrate 23 receives signals from a thermistor 14b that measures the temperature of the halogen heater lamp 14a arranged in the fixing unit 14 and controls the low voltage source 25 in such a way that the halogen heater lamp 14a is held to a constant temperature level.

Figure 3:
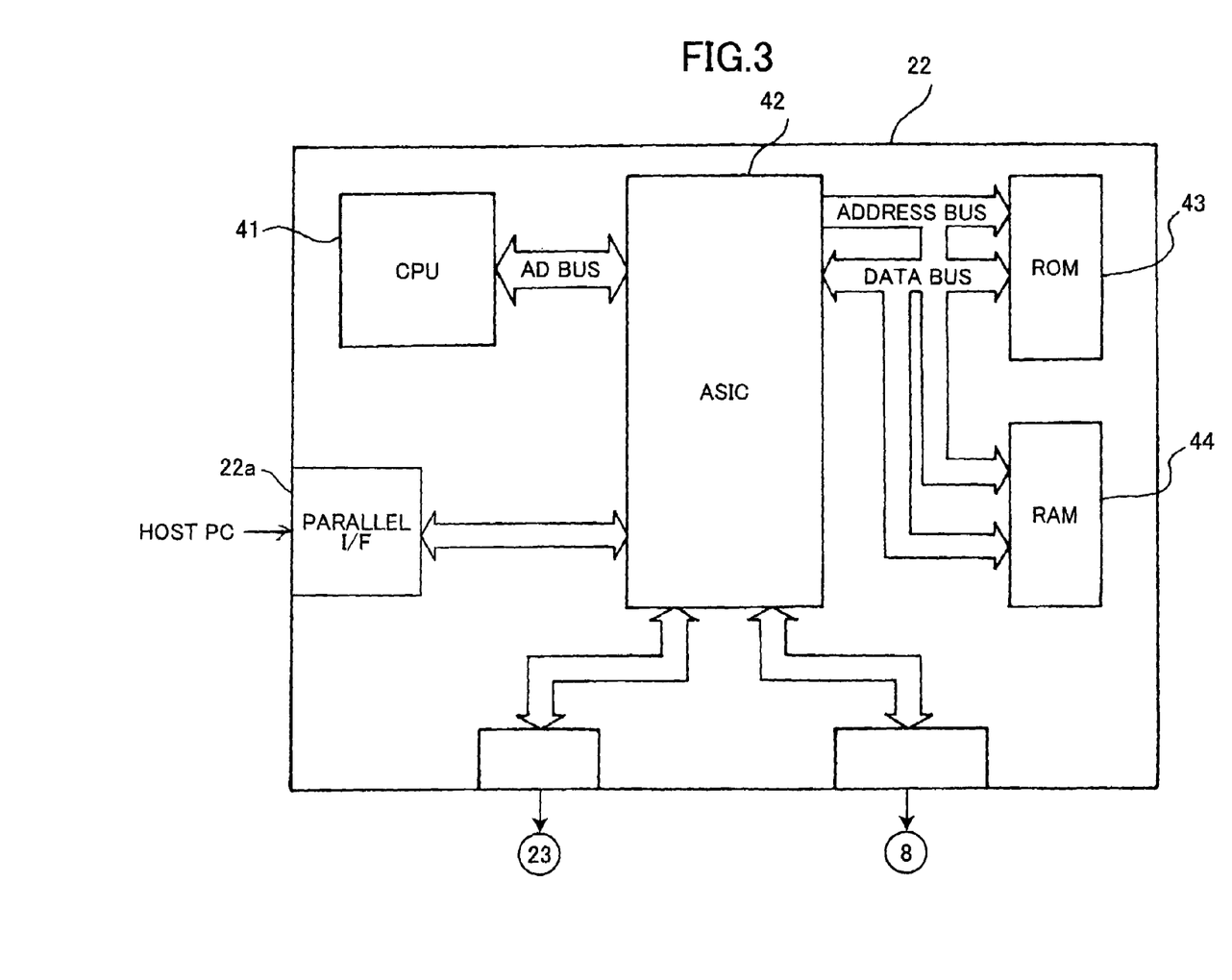
FIG. 3 is a schematic block diagram of a main substrate shown in FIG. 2.
Figure 4:
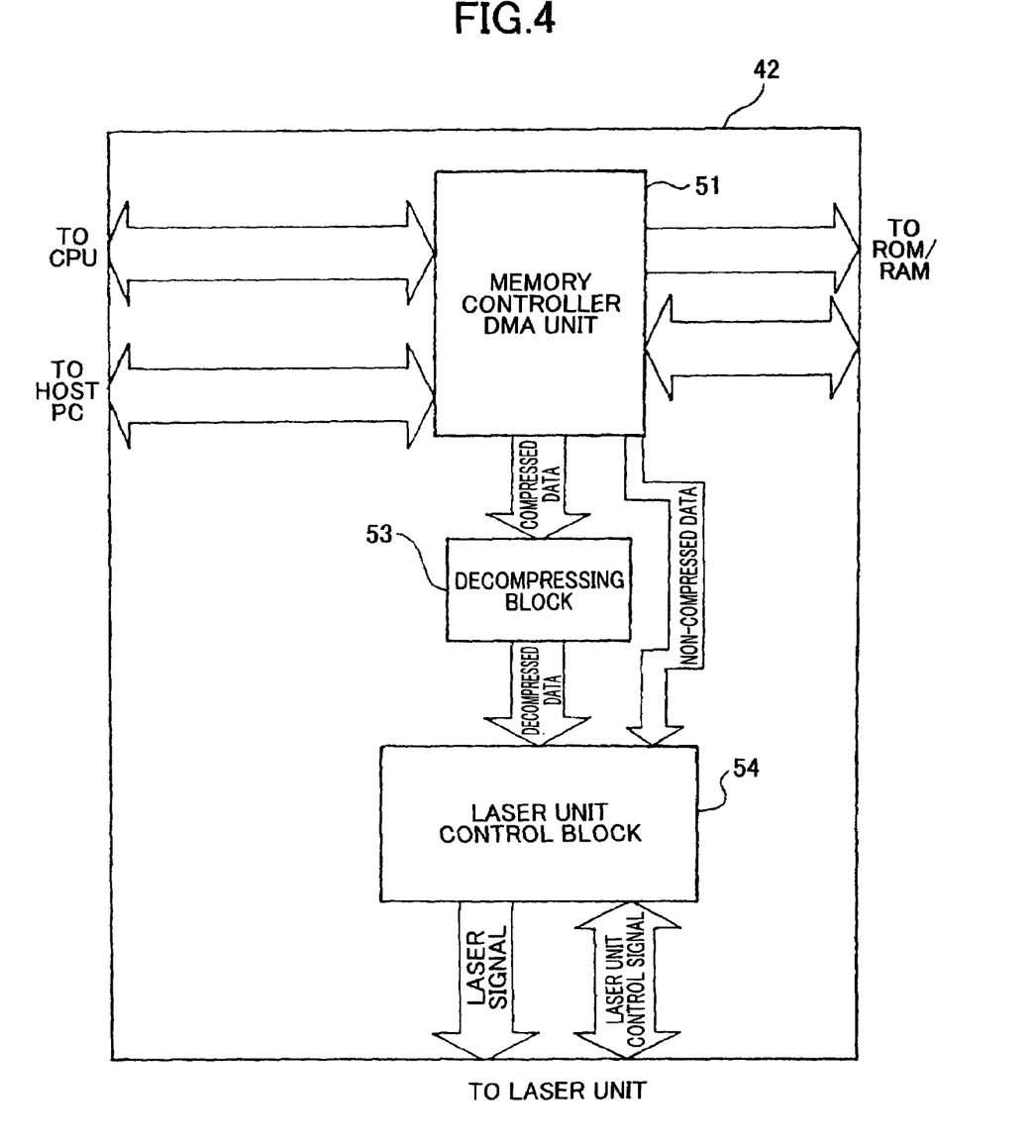
FIG. 4 is a schematic block diagram for description of image processing operation executed in ASIC in the main substrate.

Now, the data processing operation executed in the main substrate 22 of FIG. 2 will be described further by referring to FIGS. 3 and 4. FIG. 3 is a schematic block diagram showing the main substrate 22, and FIG. 4 is a schematic block diagram for description of image processing operation executed in ASIC 42 in the main substrate 22.

As shown in FIG. 3, CPU 41, ASIC 42, ROM 43 and RAM 44 are arranged on the main substrate 22 and connected to each other by way of an address bus and a data bus. The ROM 43 stores various programs and data that are to be used for controlling the operation of the laser printer 1. The CPU 41 performs various arithmetic operations on the basis of the programs stored in the ROM 43. More specifically, in this embodiment, the CPU 41 develops printing data into intermediate codes and also develops intermediate codes into image data by means of band processing. In other words, the CPU 41 functions as image data generating means.

Further, in this embodiment, the CPU 41 determines whether or not the image data need to be compressed on page-by-page basis based on the image data per se and a reference value indicative of data transferring performance from the RAM 44 to the ASIC 42. More specifically, necessity of data compression is determined by comparing the largest raster length in each page of the image data generated by the CPU 41 and stored in the RAM 44 with 80% value of the largest printing width of the laser printer 1. In other words, the CPU 41 functions as compression judgment means.

The reason for the comparison of the largest raster length with the 80% value of the largest printing width of the laser printer 1 will be described below. The amount of data that can be reduced by compression depends not only on the volume of the original data but also on the entropy of the original data. Here, the original data can be reduced by a larger amount when the entropy of the data is smaller. Thus, a number of techniques have been proposed to reduce the entropy of data by modeling.

However, in the case of reversible compression, the original data may be reduced only by about 20% at most. Differently stated, the printer is required to be so designed, in terms of system clock speed and CPU capabilities, such that data having a volume equal to about 80% of the volume of the original data can be supplied from the main substrate to the laser engines within one raster printing time period. Taking this requirement into consideration, assuming that the printer possesses its performance such that the data, obtained by compression with the 20% data reduction rate with respect to the raster contained in the image data and having the largest printing width, can be transferred to the laser engines within one raster printing time period. In such a case, the raster data having a raster length equal to or less than 80% of the largest printing width can be transferred to the printing engine within one raster printing period without undergoing compression, and it is not necessary to compress the image data. In other words, necessity of data compression can be made by comparing the raster length of the image data and a fixed reference length that is smaller than the largest printing width of the printing engine. With such an arrangement, the above-described comparing operation can be performed quickly.

The CPU 41 compresses only those parts of the image data stored in the RAM 44 that are determined to be compressed. In other words, the CPU 41 also functions as compression means.

The CPU 41 compresses the image data by means of run length coding, prediction coding or JBIG (Joint Bi-level Image Experts Group) coding in the case of binary-coded images and by means of bit plane conversion, prediction coding, block sorting (BWT (Burrows-Wheeler Transform)), JPEG (Joint Photographic Experts Group) using a non-reversible compression DCT (Discrete Cosine Transformation) method or wavelet conversion in the case of multilevel-value-coded images. In the case of multilevel-value-coded images, image data are compressed by way of a two-step process including (1) a step of modeling the image data, in which the image data are converted into a different series of signals for the purpose of facilitating image compression, and (2) a step of entropy coding, in which codes are assigned to the series of signals obtained by the conversion of (1) for reducing the code length as small as possible.

The RAM 44 stores the outcomes of various arithmetic operations of the CPU 41 and those of the ASIC 42, the printing data transmitted from the host computer and the intermediate codes as well as non-compressed image data generated by the CPU 41 and compressed image data compressed by the CPU 41 into suitable memory regions. The RAM 44 functions as memory means. The ASIC 42 operates for exchanging data between the CPU 41 and the RAM 44 and also for decompressing image data.

Further, the CPU 41 reads the non-compressed image data stored in the RAM 44 and the compressed image data also stored in the RAM 44 with an appropriate data transfer cycle that is based on a predetermined printing speed. Among the image data read from the RAM 44, the compressed data are decompressed by the ASIC 42 and then sent to the laser units 8, whereas the non-compressed image data are directly sent to the laser units 8.

Furthermore, the CPU 41 generates various instructions in such a way that the main motor 28, the solenoid 29, the polygon motor 17 and so on operate respectively at appropriate timings. The instructions generated by the CPU 41 are sent to the engine substrate 23 by way of the ASIC 42.

As shown in FIG. 4, the ASIC 42 includes a memory controller 51, a compression block 52, decompressing block 53 and a laser unit control block 54. The memory controller 51 includes a DMA (direct memory access) unit and controls the operation of data transfer to the CPU 41 and the host computer and, to the ROM 43, RAM 44, the compression block 52 and the decompressing block 53 without intervention of the CPU 41. The memory controller 51 determines whether or not the image data read from the RAM 44 are compressed image data, and outputs the compressed image data to the uncompressing block 53, or output the non-compressed image data to the laser unit control block 54.

The decompressing block 53 decompress (expands) the compressed image data. The image data restored as a result of the decompressing process are then sent to the laser unit control block 54. The laser unit control block 54 serially transmits the image data as laser signals to the laser units 8 in synchronism with the rotary motion of the polygon mirror in a manner as described above, through exchanging laser unit control signals with respect to the laser units 8. Thus, the laser unit control block 54 operates as transfer means.

Figure 5:
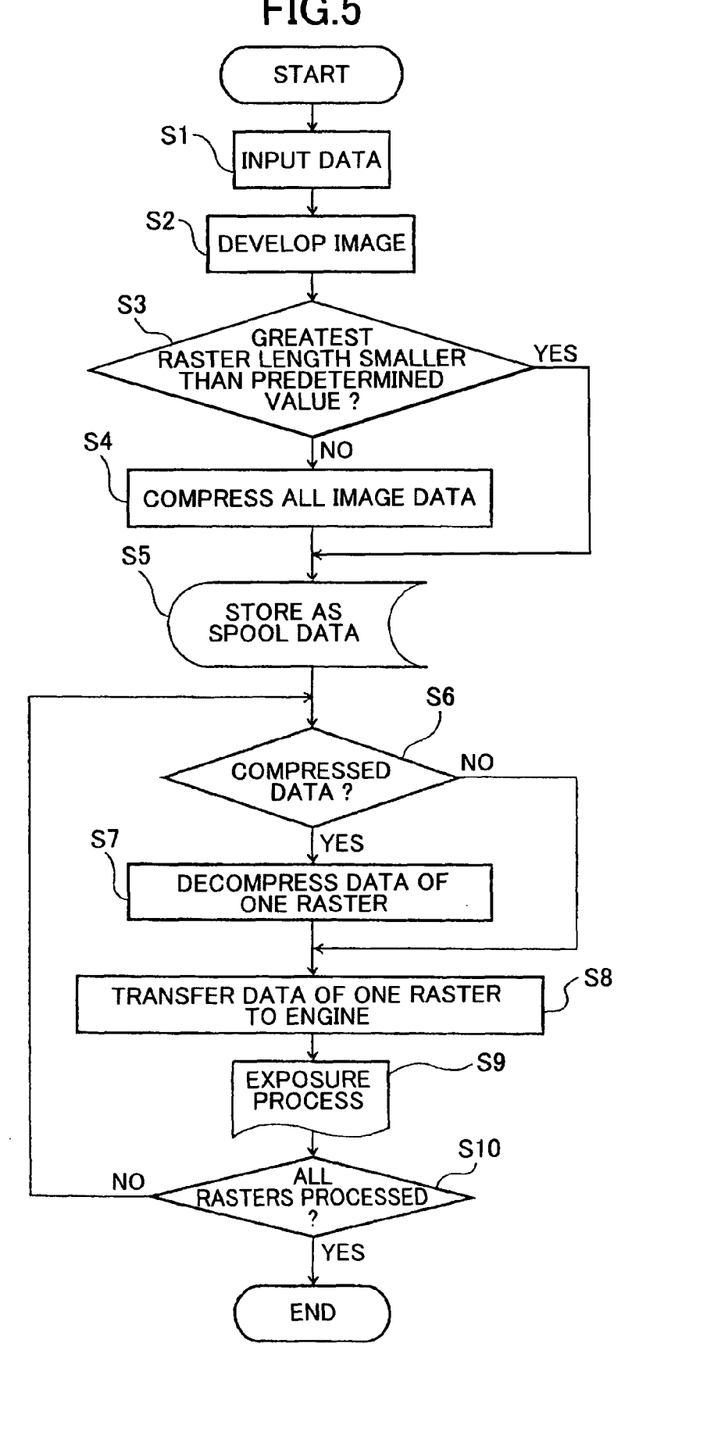
FIG. 5 is a flow chart for description of operation of the laser printer of FIG. 1.

Next, the operation of the laser printer 1 according to the first embodiment will be described by referring to the flowchart of FIG. 5. First, in Step S1, printing data are transmitted from the host computer to the main substrate 22 by way of the parallel I/F 22a. Then, the printing data are given to the ASIC 42 and stored in the RAM 44 by the memory controller 51.

Then, in Step S2, the printing data stored in the RAM 44 are developed into image data of a raster data format. More specifically, the CPU 41 sequentially reads the printing data stored in the RAM 44 and develops the printing data of a page into intermediate codes that are divided into a plurality of bands. The intermediate codes obtained by the developing operation are then sequentially stored in the RAM 44. As the intermediate codes of a page have been stored in the RAM 44, the CPU 41 reads the intermediate codes stored in the RAM 44 and develops them into image data of a raster data (bit map) format by means of a band processing operation. For instance, intermediate codes are developed into multi-level-value image data (dot data) such as 8-bit data.

Subsequently, in Step S3, the CPU 41 determines whether or not the largest raster length in each page of the image data stored in the RAM 44 exceeds the reference value indicative of the data transfer performance (the 80% of the largest printing width). A definition on the image size of printing data written in a page describing language may be used for selecting the raster having the greatest raster length of each page. Alternatively, the raster length of each raster can be stored at the time of data development so as to determine the raster having the greatest raster length.

If determination falls the greatest raster length exceeds the 80% value of the largest printing width (S3: NO), the routine proceeds to Step S4 where the entire image data of the page containing such greatest raster length as used for the judgment of Step S3 are compressed by the CPU 41, using the above described compression technique. Then, in Step S5, the compressed image data are stored in the RAM 44 as spool (simultaneous peripheral operation on-line) data. When, on the other hand, if the greatest raster length does not exceed the 80% value of the largest printing width as a result of judgment in S3 (S3: YES), the routine skips Step S4 and moves to Step S5 where the non-compressed image data are stored in the RAM 44 as spool data.

The CPU 41 generates a command signal for conveying the sheet of paper 7 at a speed that corresponds to the predetermined printing speed, and outputs the command signal to the engine substrate 23. At the same time, the CPU 41 outputs an instruction to the engine substrate 23 for driving the polygon motor 17 at a rotary speed that corresponds to the printing speed.

Subsequently, in Step S6, when a sheet edge sensor (not shown) detects that the sheet of paper 7 reaches the print start position, the CPU 41 reads the image data stored in the RAM 44 on a raster by raster basis in synchronism with the rotary motion of the polygon mirror and transmit every raster data into the ASIC 42. Each raster image data transmitted in the ASIC 42 is subjected to judgment by the memory controller 51 as to whether the raster data are compressed image data or non-compressed image data.

If the judgment falls that the raster data are compressed image data (S6: YES), the compressed image data are output to the decompressing block 53. Then, in Step S7, the compressed image data of one raster are decompressed by the decompressing block 53. Thus, the original image data are restored and output to the laser unit controller block 54.

On the other hand, if the judgment falls that the raster data are non-compressed image data (S6: NO), the non-compressed image data are output from the memory controller 51 to the laser unit control block 54 and the routine skips Step S7 and proceeds to Step S8.

The image data given to the laser unit control block 54 are then transferred from the laser unit control block 54 to each of the laser units 8 on a raster by raster basis in Step S8 in synchronism with the rotation of the polygon mirror. Then, in Step S9, the laser beams whose respective intensities are modulated based on the image data are emitted from the laser beam source 16 so that the photosensitive drums 2, 3, 4 and 5 are exposed to the respective laser beams to form one raster electrostatic latent image. At this time, if the data given to the laser unit control block 54 are multilevel-value data such as 8-bit data, the pulse widths (ON times) are modified respectively according to the multilevel-value data in the laser unit control block 54. Therefore, a processing of conversion of multilevel-value data into binary data is unnecessary.

Then, in Step S10, the CPU 41 determines whether or not the processing operations of Steps S6 through S9 have been completed for all the rasters in each page. If determination falls that the processing operations have not been completed (S10: NO), the routine returns to Step S6 to repeat the above described processing operations. If, on the other hand, determination falls that the processing operations have been completed (S11: YES), a color image is formed on the sheet of paper 7 by way of the above-described process.

In the above described embodiment the judgment processing in Step S6 and data decompression processing in Step S7 are synchronized with the rotating operation of the polygon mirror and the processing of data transfer to the laser units 8. However, Steps S6 and S6 for data decompression can be performed without being synchronized with the polygon mirror rotating operation. In the latter case, it is only necessary that the image data and decompressed image data those provisionally judged on raster by raster basis are temporarily stored in the memory controller 51, and the stored image data are transferred in synchronism with the operation of each laser unit 8 based on the instruction from the CPU 41.

Thus, according to the first embodiment, it is possible to avoid compressing image data that involve only short raster lengths and hence do not need to be compressed in view of the ability of transferring data from the RAM 44 to the ASIC 42, because the necessary of image data compression is judged on a basis of the image data themselves and the data transferring ability from the RAM 44 to the ASIC 42. Thus, it is possible to prevent a heavy load from being imparted on the CPU 41 that is responsible for data compressing operations, and hence possible drops of the processing speed of the laser printer 1 as a whole can be avoided. This advantage is particularly remarkable in this embodiment because it is not the ASIC 42 but the CPU 41 that is responsible for data compressing operations.

Further, can be avoided situations where a coding table is prepared as a result of compression of image data that involve only short raster lengths to disadvantageously increase the volume of data. Furthermore, since image data involving long raster length are transferred from the RAM 44 to the ASIC 42 while the data being compressed taking data transferring ability from the RAM 44 to the ASIC 42 into consideration, the embodiment can perform high speed printing operations without giving rise to overloaded situations of the laser printer or raising the cost of improving the ability of transferring data from the RAM 44 to the ASIC 42. In this way, in this embodiment, the CPU 41 functions as compression means and, even if the image forming device is designed to have a relatively low data transferring ability from the RAM 44 to the ASIC 42 in order to reduce the cost, the processing speed of the laser printer 1 as a whole is prevented from being reduced when the image data to be used for printing involve only short raster lengths, while it is also possible to realize high speed printing, using compressed image data that involve long raster lengths.

Further, in the laser printer 1 of this embodiment, printing data are expressed in the page describing language and image data are raster data. Therefore, this embodiment is highly available for processing image data on a page by page basis. Furthermore, necessity of data compression is judged by comparing a reference value that represents the data transferring ability from the RAM 44 to the ASIC 42 with the greatest raster length of all the rasters constituting the image data of a page. Therefore, the laser printer 1 of this embodiment suitably determines the necessity of compression. Still additionally, as described above, the greatest raster length of all the rasters constituting the image data of a page to be printed is compared with the reference value. Consequently, preliminary print processing operation can be performed at high speed, because it is no longer necessary to determine the necessity of compression on the basis of each raster length of each raster of the image data. Furthermore, the control process is performed on a page by page basis, and therefore, efficient processing can result.

Further, in this embodiment, necessity of compressing image data is determined by comparing a reference value that represents the data transferring ability from the RAM 44 to the ASIC 42 with the greatest raster length among all the rasters constituting the image data of a page. Thus, the determination can be made simply and easily. Particularly, since the reference value is a fixed length that is smaller than the largest printing width of the laser engines, the processing operation for the comparison can be performed quickly. In this embodiment, the fixed length is made equal to the 80% value of the largest printing width of the laser printer 1, taking the possible data reduction ratio with the compression into consideration. In other words, suppression of reduction of the processing speed and high speed printing are balanced optimally. Note, however, that the value of "80%" can be modified to a level ranging between 70% and 90% taking the function of the printing speed and the characteristics of the image data to be used into consideration.

Furthermore, only the image data that need to be compressed are compressed and decompressed, and then the data are transferred from the laser unit control block 54 to each laser units 8 simultaneously. Therefore, image data transfer can be performed efficiently to realize high speed printing.

Furthermore, since image data are transferred from the laser unit control block 54 to the laser units 8 on a raster by raster basis in synchronism with the scanning operations of the laser units 8, image data are supplied to the laser unit control block 54 on a stable basis. Accordingly, the operation of supplying data from the laser unit control block 54 to the laser units 8 is also stable and hence high definition images can be formed quickly by means of the laser scanner unit.

Further, the CPU 41 can adopt any of the above described various compression techniques that matches the data format to be used for printing. As a result, the processing efficiency of the entire printer can be improved. Further, image data are generated as color data so that it is possible to form color images while exploiting the above identified advantages.

As a modification to the first embodiment, instead of the fixed reference value in Step S3, available is a reference value that corresponds to the largest data volume that can be transferred from the RAM 44 without compressing the image data within the one raster printing time period determined by the function of the requested printing speed and the resolution of laser units 8. With such an arrangement, necessity of data compression can be more suitably determined, because a change in the largest transferable data volume due to a change in the time period necessary for forming an image for one raster determined by the requested printing speed and the resolution of the printing engine is taken into consideration.

Now, the general formula for computing the reference value for the purpose of this modified embodiment will be described below. Assume that, in the description below, the width and the length of a sheet of paper to be used for printing are $L_h$ (in.), $L_v$ (in.), the printing speed is $V_p$ (ppm: pages/min) and the gap separating two consecutive sheets of paper in a continuous printing operation is $L_g$ (in.), while the resolution is $D_e$ (dpi: dots/in.), the bus cycle of the RAM is $T_b$ (sec) and the bus width of the RAM is $B_w$ (bits), and the gradation value of image data is $B_g$ (bits).

In this case, when the time period required for printing one sheet of paper is $T_p$ (sec)=$60/V_p$, the sheet conveying speed $V_f$ (in./sec) is expressed by $(L_v+L_g)/T_p$. Further, the time period necessary for moving the sheet of paper by a distance of one line $T_l$ is equal to $(1/D_e)\text{in}./V_f$ in./sec. This time period is equal to the time period during which the one line data are transferred. In this way, the one raster printing time period is determined with the function of the printing speed $V_p$ and the resolution $D_e$. On the other hand, if the number of times by which the RAM can be accessed within the time $T_l$ is $N_r$ ($=T_l/T_b$), the data volume $B_l$ (bit) that can be read from the RAM within the time period $T_l$ is expressed by $B_l=N_r*B_w$. Therefore, the raster length $L_r$ (in.) that is used as reference value that corresponds to the data volume transferrable from the RAM within the time period $T_l$ without compression is expressed by $L_r=B_l/(B_g*D_e)$.

The modified embodiment will be described in more detail assuming that a letter-size sheet of paper (8.5 in. in width×11 in. in length) is to be used for a printing operation with a requested (initial) printing speed of 32 ppm (page/min).

First, in view of the requested printing speed of 32 ppm, one page printing must be performed at a speed of 60 sec/32 ppm=1.875 sec. If the gap separating two consecutive sheets of paper is 4 in. in a continuous printing operation, sheets of paper needs to be moved at a rate of (11 in.+4 in.)/1.875 sec=8 in./sec. If the resolution is 600 dpi (dots/in.), it takes (1/600) in./8 in./sec=208.3 isec to move a sheet of paper for one printing line (for one raster). In other words, image data need to be sent to the laser units 8 at a cycle of 208.3 isec.

If, for example, RAM 44 has bus cycle of 100 nsec, the number of times of data transfer from the RAM 44 within 208.3 isec. will be 208.3 isec/100 nsec=2083. Therefore, if the bus width of the RAM 44 is 16 bits, 2083×16 bits=33,328 bits can be transferred from the RAM 44 to the ASIC 42 within 208.3 isec.

When this transferable data amount is converted to the raster length, 33,328 bits/(8 bit×600 dpi)=6.94 in. is obtained provided that data gradation level is 8 bit. Therefore, it is determined that the image data of a page whose greatest raster length exceeds 6.94 inches will be compressed. Thus, with this modified embodiment, necessity of data compression can be suitably determined upon consideration of variation in maximum data amount, this variation being dependent on variation in one raster printing speed changable with the function of the requested printing speed and the resolution of the laser units 8.

If the data volume (the number of bits) of each raster of image data have already been recognized, necessity of compression can be determined by a comparison of the number of bits of the raster having the greatest raster length with the above-described transferable data volume (33,328 bits). In the latter case, the processing for reducing or converting to the raster length becomes unnecessary. In this way, modification to the first embodiment can be made through a comparison using the raster length as well as using a value relating to the raster length, such as the number of dots and the number of bits.

Another modification to the first embodiment will next be described. In the first embodiment, necessity of image data compression is determined on a page by page basis, and the greatest raster length of all the rasters constituting the image data of the page is compared with the 80% value of the largest printing width. On the other hand, in this modified embodiment, each raster length of each raster constituting the image data is compared with the 80% value of the largest printing width and, if there is a raster whose raster length exceeds the 80% value of the largest printing width, the image data for the one page are determined to be compressed. In the latter case, the raster length of each of the rasters constituting the image data can be compared with the 80% value of the largest printing width with respect to all rasters in the page. Alternatively, the operation of comparing each raster length with the 80% value of the largest printing width can be performed sequentially and the operation can be terminated when a raster whose raster length exceeds the 80% value is found. While the average number of times of repeating the comparing operation is greater in this modified embodiment than in the above described embodiment, this modified embodiment provides all the remaining advantages same as those of the above-described embodiment. Additionally, with this modified embodiment, selection of the raster having the greatest raster length in each page becomes unnecessary.

A laser printer according to a second embodiment of the present invention will next be described. Since the mechanical structure of the laser printer of this embodiment is approximately the same as the laser printer 1 of the first embodiment, it will not be described in detail any further. The components of the laser printer of the second embodiment that correspond to their counterparts of the laser printer of the first embodiment are denoted respectively by the same reference numerals and characters.

The laser printer according to the second embodiment differs from the first embodiment in terms of the process of compression determining process and compression process. In the first embodiment, necessity of compression is determined by comparing the greatest raster length of all the rasters constituting the image data with the reference value, and the all image data constituting the page which contains the raster whose raster length exceeds the reference value are compressed on page by page basis. By contrast, in the second embodiment, each raster length of each raster of image data is compared with the reference value, and necessity of compression is determined on a raster by raster basis.

Figure 6:
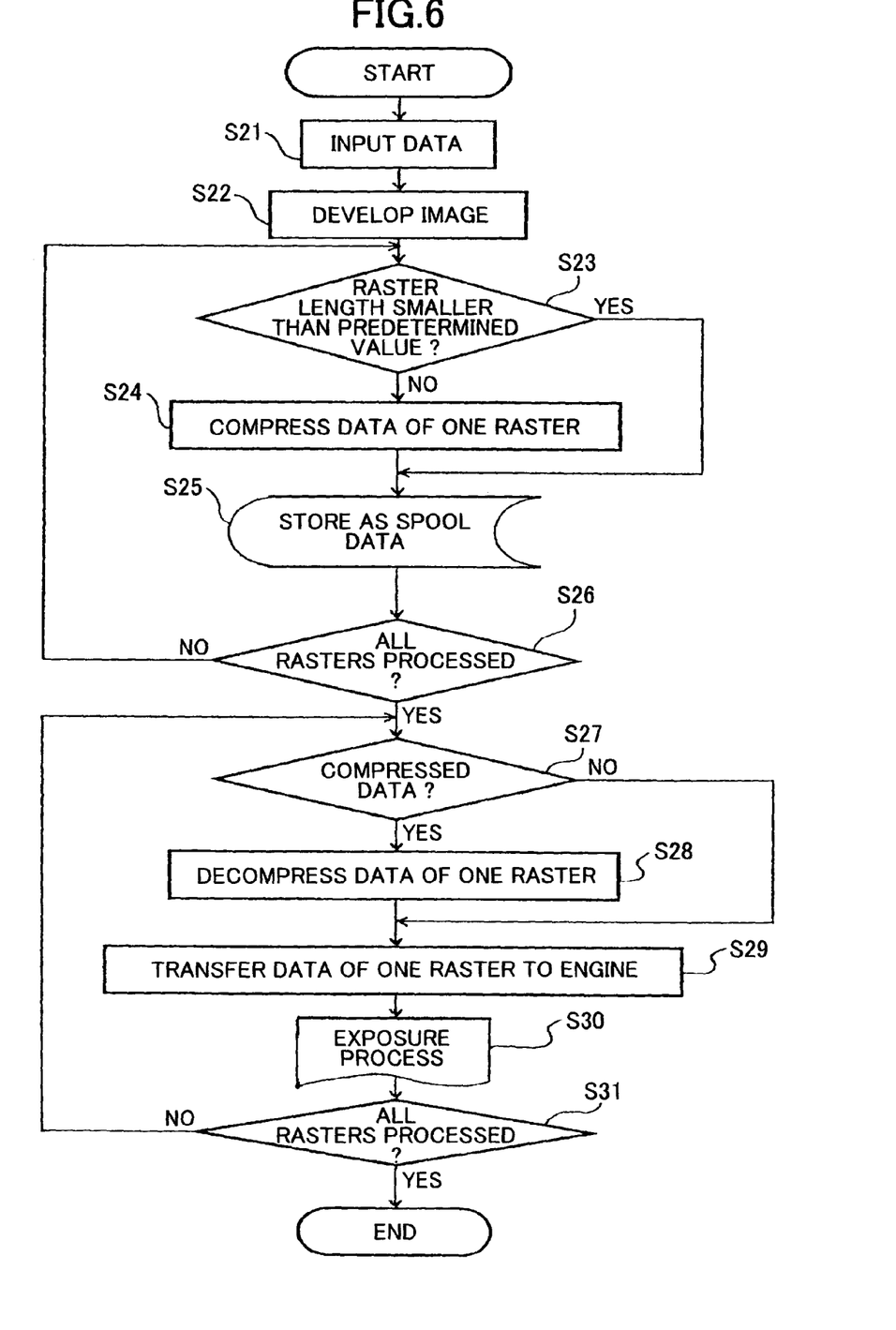
FIG. 6 is a flow chart for description of operation of a laser printer according to a second embodiment of the present invention.

Next, the operation of the laser printer according to the second embodiment will be described by referring to the flowchart of FIG. 6. First, in Step S21, printing data are transmitted from the host computer to the main substrate 22 by way of the parallel I/F 22a. Then, the printing data are given to the ASIC 42 and stored in the RAM 44 by the memory controller 51.

Then, in Step S22, the printing data stored in the RAM 44 are developed into image data of a raster data format. More specifically, the CPU 41 sequentially reads the printing data stored in the RAM 44 and develops the printing data of a page into intermediate codes that are divided into a plurality of bands. The intermediate codes obtained by the developing operation are then sequentially stored in the RAM 44. As the intermediate codes of a page have been stored in the RAM 44, the CPU 41 reads the intermediate codes stored in the RAM 44 and develops them into image data of a raster data (bit map) format by means of a band processing operation. For instance, intermediate codes are developed into multi-level-value image data (dot data) such as 8-bit data.

Subsequently, in Step S23, the CPU 41 determines whether or not each raster length of each raster constituting the image data and stored in the RAM 44 exceeds the reference value indicative of the data transfer performance (80% of the largest printing width).

If determination falls the raster length exceeds 80% value of the largest printing width (S23: NO), the routine proceeds to Step S24 where the raster data relating to the raster used for the judgment of Step S23 are compressed by the CPU 41 using the above described compression technique. Then, in Step S25, the compressed image data of the one raster are stored in the RAM 44 as spool data. On the other hand, if the one raster length does not exceed the 80% value of the largest printing width as a result of judgment in S23 (S23: YES), the routine skips Step S24 and moves to Step S25 where the non-compressed image data of the one raster are stored in the RAM 44 as spool data.

Then, in Step S26, the CPU 41 determines whether or not the processing operations of Steps S23 through S25 have been completed for all the rasters of the image data to be printed. If determination falls that the processing operations have not been completed (S26: NO), the routine returns to Step S23 to repeat the above described processing operations. If, on the other hand, determination falls that the processing operations have been completed (S26: YES), the routine proceeds into Step S27.

In Step S27, the CPU 41 generates a command signal for conveying the sheet of paper 7 at a predetermined conveying speed that corresponds to the predetermined printing speed, and outputs the command signal to the engine substrate 23. At the same time, the CPU 41 outputs an instruction to the engine substrate 23 for driving the polygon motor 17 at a rotary speed that corresponds to the printing speed.

Subsequently, in Step S27, when a sheet edge sensor (not shown) detects that the sheet of paper 7 reaches the print start position, the CPU 41 reads the image data stored in the RAM 44 on a raster by raster basis in synchronism with the rotary motion of the polygon mirror and transmits every raster data into the ASIC 42. Each one raster image data transmitted in the ASIC 42 is subjected to judgment by the memory controller 51 as to whether the raster data are compressed image data or non-compressed image data.

If the judgment falls that the raster data are compressed image data (S27: YES), the compressed image data are output to the decompressing block 53. Then, in Step S28, the compressed image data of one raster are decompressed by the decompressing block 53. Thus, the original image data are restored and output to the laser unit controller block 54.

On the other hand, if the judgment falls that the raster data are non-compressed image data (S27: NO), the non-compressed image data are output from the memory controller 51 to the laser unit control block 54 and the routine skips Step S28 and proceeds to Step S29.

The image data given to the laser unit control block 54 are then transferred from the laser unit control block 54 to each of the laser units 8 on a raster by raster basis in Step S29 in synchronism with the rotation of the polygon mirror. Then, in Step S30, the laser beams whose respective intensities are modulated based on the image data are emitted from the laser beam source 16 so that the photosensitive drums 2, 3, 4 and 5 are exposed to the respective laser beams to form one raster electrostatic latent image.

Then, in Step S31, the CPU 41 determines whether or not the processing operations of Steps S27 through S30 have been completed for all the rasters in each page. If determination falls that the processing operations have not been completed (S31: NO), the routine returns to Step S27 to repeat the above described processing operations. If, on the other hand, determination falls that the processing operations have been completed (S31: YES), a color image is formed on the sheet of paper 7 by way of the above-described process.

In this way, in the second embodiment, image data are not compressed on a page by page basis but compressed on a raster by raster basis. In other words, unlike the first embodiment, the second embodiment can obviate a situation where short rasters contained in a page are also compressed when the greatest raster length of the page exceeds the 80% value of the largest printing width. Thus, the necessity of image data compression and actual compression can be made more delicately, and therefore, the risk of reducing the processing speed of the laser printer can be suppressed effectively. Further, the second embodiment provides the remaining advantages the same as those of the first embodiment.

While the invention has been described in detail and with reference to the specific embodiments thereof, it would be apparent to those skilled in the art that various changes and modifications may be made therein without departing from the sprit and scope of the invention. For example, while color laser printers are embodied in the above-described embodiments, the present invention is also available for monochromatic printers. Further, the color printer are not limited to the tandem type printer. Moreover, the present invention is also applicable to printers that do not employ laser engines as recording engines image, and the present invention can be applied to various image forming device such as a facsimile and a copying machine.

Beside, the necessity of compression can be made on the basis of the attributes of image data other than the raster length of each of the rasters constituting the image data, and on the basis of data transferring performance from the memory means to the transfer means. Furthermore, the ASIC 42 arranged on the main substrate 22 may not be a requisite element if the CPU 41 takes decompressing function instead of the ASIC 42. Finally, the necessity of data compression can be made neither on a page by page basis nor on a raster by raster basis but on the basis of some other unit.

What is claimed is:

1. An image forming device comprising:
   image data generation means for generating image data from original data;
   compression determining means for determining whether or not the image data generated by the image data generating means is to be compressed;
   compression means for compressing at least a part of the image data required to be compressed as determined by the compression determining means among the image data generated by the image data generation means;
   memory means for storing a remaining part of the image data remained non-compressed as determined by the compression determining means and the part of the image data compressed by the compression means;
   decompressing means for decompressing the part of the image data compressed by the compression means and stored in the memory means;
   a printing engine for forming an image on an image recording medium based on the image data; and
   transfer means for transferring the non-compressed image data stored in the memory means and the decompressed image data decompressed by the decompressing means to the printing engine, wherein the compression determining means determines necessity of data compression on a basis of the image data and a data transferring performance from the memory means to the transfer means,
   wherein the compression determining means employs a reference value indicative of the data transferring performance from the memory means to the transfer means, the reference value being based on the following formula:

$Lr=Bl/(Bg*De)$, where $Lr$ is the reference value, $Bl$ is data volume that can be read from the memory means within a predetermined time period, $Bg$ is gradation value of the image data, and $De$ is resolution.

2. The image forming device as claimed in claim 1, wherein the original data are expressed in a page describing language and the image data comprise raster data.

3. The image forming device as claimed in claim 1,
   wherein the memory means has a memory region where the image data amounting at least one page is storable, and
   wherein the compression determining means includes:
      selection means for selecting a specific raster having the greatest raster length among rasters constituting the image data of the page; and
      judging means for judging whether or not data volume of the specific raster exceeds the reference value and determining compression with respect to all image data constituting the page if the data volume of the specific raster exceeds the reference value.

4. The image forming device as claimed in claim 1, wherein the compression determining means comprises:
   comparing means for successively comparing each raster length of each raster constituting the image data with the reference value on a raster-by-raster basis; and
   determining means for determining whether or not the image data are to be compressed if there is a raster whose raster length exceeds the reference value.

5. The image forming device as claimed in claim 4, wherein the memory means has a memory region where the image data amounting at least one page is storable, and wherein the compression determining means further comprises stopping means for stopping operation of the comparing means when a raster whose raster length exceeds the reference value is found, the determining means determining data compression with respect to all image data constituting the page as a result of stopping operation.

6. The image forming device as claimed in claim 1, wherein the compression determining means comprises:

comparing means for successively comparing each raster length of each raster constituting the image data with the reference value on a raster-by-raster basis; and determining means for determining, on a raster-by-raster basis, a necessity of compression of the raster if raster length of the raster exceeds the reference value.

7. The image forming device as claimed in claim 1, wherein the reference value represents a fixed length equal to or smaller than a value of the largest image forming width provided by the printing engine.

8. The image forming device as claimed in claim 7, wherein the reference value represents a fixed length whose value is in a range from 70% to 90% of the largest image forming width of the printing engine.

9. The image forming device as claimed in claim 1, wherein the reference value represents a length corresponding to non-compressed and largest data volume transferable from the memory means to the transfer means within one raster image forming period defined with functions of a requested image forming speed and a resolution of the printing engine.

10. The image forming device as claimed in claim 1, wherein image data generated by the image data generation means comprise color data for performing color image printing based on the color data.

11. The image forming device as claimed in claim 1, wherein the printing engine comprises a conveyance section for conveying the image recording medium along a conveying route, a photosensitive body, an exposure section for forming an electrostatic latent image on the photosensitive body, a developing unit for developing the electrostatic latent image on the photosensitive body into a visible image, and a drive means for driving the conveyance section, the photosensitive body, the exposure section, and a developing unit, and wherein the transfer means transferring the part of the image data and the remaining part of the image data to the exposure section, the part of the image data having been stored in the compressed form in the memory means and decompressed by the decompressing means, and the remaining part of the image data being stored in non-compressed form in the memory means.

12. The image forming device as claimed in claim 11, wherein a plurality of combinations each including the photo-sensitive body, the exposure section, and the developing unit are arranged along the conveyance route for every color different from each other.

13. The image forming device as claimed in claim 2, wherein the printing engine comprises a laser engine including a laser scanner unit performing the scanning operation, the data of the raster being transferred from the transfer means to the laser engine on a raster-by-raster basis in synchronism with the scanning operation.

14. The image forming device as claimed in claim 1, wherein the compression means compresses image data through one of run length coding, prediction coding, JBIG, bit plane conversion, prediction coding, block sorting, JPEG using a non-reversible compression DCT method, and wavelet conversion.

15. An image forming method comprising the steps of:

generating image data from original data;

determining necessity of compression with respect to the image data generated in the generating step;

compressing a part of the image data, the part being determined to be compressed in the determining step;

storing in a memory section the part of the image data having been compressed in the compressing step and a remaining part of the image data remained non-compressed as a result of determination in the determining step;

decompressing the part of the image data having been compressed in the compression step and stored in the memory section; and transferring, from a transfer section to a printing engine, the non-compressed remaining part of the image data stored in the memory section and the part of the image data decompressed in the decompressing step;

wherein the determining step determines the necessity on a basis of the image data and data transferring performance from the memory section to the transfer section, wherein the determining step includes employing a reference value indicative of the data transferring performance from the memory section to the transfer section, the reference value being based on the following formula:

$Lr=Bl/(Bg*De)$, where Lr is the reference value, Bl is data volume that can be read from the memory section within a predetermined time period, Bg is gradation of the image data, and De is resolution.

16. An image forming device comprising:

image data generation means for generating image data from original data, the image data includes raster data;

compression determining means for determining whether or not the image data generated by the image data generating means is to be compressed;

compression means for compressing at least a part of the image data required to be compressed as determined by the compression determining means among the image data generated by the image data generation means;

memory means for storing a remaining part of the image data remained non-compressed as determined by the compression determining means and the part of the image data compressed by the compression means;

decompressing means for decompressing the part of the image data compressed by the compression means and stored in the memory means;

a printing engine for forming an image on an image re-cording medium based on the image data;

transfer means for transferring the non-compressed image data stored in the memory means and the decompressed image data decompressed by the decompressing means to the printing engine, wherein the compression determining means determines necessity of data compression on a basis of the image data and a data transferring performance from the memory means to the transfer means, wherein the compression determining means employs a reference value indicative of the data transferring performance from the memory means to the transfer means, wherein the reference value represents a fixed length equal to or smaller than a value of the greatest image forming width provided of the printing engine, and wherein the compression determining means determines whether to compress the image data if greatest raster length in each page of the image data exceeds a predetermined percentage value of the largest image forming width provided of the printing engine.

17. The image forming device as claimed in claim 16, wherein the memory means has a memory region where the image data amounting at least one page is storable, and wherein the compression determining means includes:
selection means for selecting a specific raster having the greatest raster length among rasters constituting the image data of the page; and
judging means for judging whether or not data volume of the specific raster exceeds the reference value and determining compression with respect to all image data constituting the page if the data volume of the specific raster exceeds the reference value.

18. The image forming device as claimed in claim 16, wherein the compression determining means comprises:
comparing means for successively comparing each raster length of each raster constituting the image data with the reference value on a raster-by-raster basis; and
determining means for determining, on a raster-by-raster basis, a necessity of compression of the raster if raster length of the raster exceeds the reference value.

19. The image forming device as claimed in claim 16, wherein the reference value represents a fixed length whose value is in a range from 70% to 90% of the largest image forming width of the printing engine.

20. An image forming method comprising the steps of:
generating image data from original data, the image data including raster data;
determining necessity of compression with respect to the image data generated in the generating step;
compressing a part of the image data, the part being determined to be compressed in the determining step;
storing in a memory section the part of the image data having been compressed in the compressing step and a remaining part of the image data remained non-compressed as a result of determination in the determining step;
decompressing the part of the image data having been compressed in the compression step and stored in the memory section; and
transferring, from a transfer section to a printing engine, the non-compressed remaining part of the image data stored in the memory section and the part of the image data decompressed in the decompressing step, wherein the determining step determines the necessity on a basis of the image data and data transferring performance from the memory section to the transfer section, wherein the reference value represents a fixed length equal to or smaller than a value of the largest image forming width provided by the printing engine, wherein the determining step includes employing a reference value indicative of the data transferring performance from the memory section to the transfer section, and wherein the determining step determines the necessity of compression based on whether greatest raster length in each page of the image data exceeds a predetermined percentage value of the largest image forming width of the printing engine.

21. The image forming method as claimed in claim 20, wherein the memory section has a memory region where the image data amounting at least one page is storable, and wherein the determining step includes:
selecting a specific raster having the greatest raster length among rasters constituting the image data of the page; and
judging whether or not data volume of the specific raster exceeds the reference value and determining compression with respect to all image data constituting the page if the data volume of the specific raster exceeds the reference value.

22. The image forming method as claimed in claim 20, wherein the determining step includes:
successively comparing each raster length of each raster constituting the image data with the reference value on a raster-by-raster basis; and
determining, on a raster-by-raster basis, a necessity of compression of the raster if raster length of the raster exceeds the reference value.

23. The image forming method as claimed in claim 20, wherein the reference value represents a fixed length whose value is in a range from 70% to 90% of the largest image forming width of the printing engine.

* * * * *